US007383100B2

(12) United States Patent
Ng-Thow-Hing et al.

(10) Patent No.: US 7,383,100 B2
(45) Date of Patent: Jun. 3, 2008

(54) EXTENSIBLE TASK ENGINE FRAMEWORK FOR HUMANOID ROBOTS

(75) Inventors: Victor Ng-Thow-Hing, Sunnyvale, CA (US); Evan Drumwright, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 78 days.

(21) Appl. No.: 11/529,052

(22) Filed: Sep. 27, 2006

(65) Prior Publication Data

US 2007/0093940 A1    Apr. 26, 2007

Related U.S. Application Data

(60) Provisional application No. 60/722,340, filed on Sep. 29, 2005.

(51) Int. Cl.
*G06F 19/00* (2006.01)
(52) U.S. Cl. ............... 700/245; 700/247; 700/248; 700/249; 700/258; 700/259; 318/568.1; 318/568.11; 318/568.12; 318/568.2; 318/569; 901/1; 901/15; 901/47
(58) Field of Classification Search ........... 700/245, 700/247, 248, 249, 258, 259; 318/568.1, 318/568.11, 568.12, 568.2, 569; 901/1, 15, 901/47
See application file for complete search history.

(56) References Cited

U.S. PATENT DOCUMENTS 6,718,232 B2 * 4/2004 Fujita et al. ............... 700/245

| 6,738,065 | B1 | 5/2004 | Even-Zohar |
| 6,889,118 | B2 | 5/2005 | Murray, IV et al. |
| 6,939,192 | B1 * | 9/2005 | Munch et al. ............... 446/91 |
| 2006/0184273 | A1 * | 8/2006 | Sawada et al. ............. 700/245 |
| 2007/0112462 | A1 * | 5/2007 | Kim et al. ................. 700/245 |

OTHER PUBLICATIONS

Cho et al. A control architecture to achieve manipulation task goals for a humanoid robot, 1998, IEEE, p. 206-212.*
Patkar et al., Tactical mobility and navigational strategies of a group of mobile robots using fuzzy logic, 2000, IEEE, p. 229-236.*
Brooks, R.A., "A Robust Layered Control System for a Mobile Robot," IEEE Journal of Robotics and Automation, Mar. 1986, pp. 14-23, vol. RA-2, No. 1.
Mataric, M.J., "Behaviour-Based Control: Examples from Navigation, Learning, and Group Behavior," Journal of Experimental and Theoretical Artificial Intelligence, 1997, pp. 323-336, vol. 9, No. 2-3.

(Continued)

*Primary Examiner*—Khoi H. Tran
*Assistant Examiner*—McDieunel Marc
(74) *Attorney, Agent, or Firm*—Fenwick & West LLP; Mark Duell

(57) ABSTRACT

An extensible task engine framework for humanoid robots. Robot instructions are stored as tasks and skills. Tasks are designed so that they can be executed by a variety of robots with differing configurations. A task can refer to zero or more skills. A skill can be designed for a particular configuration of robot. A task can be transferred from robot to robot. When executed on a particular robot, the task makes calls to one or more skills that can take advantage of the capabilities of that robot.

27 Claims, 6 Drawing Sheets

OTHER PUBLICATIONS

Mataric, M.J., "Getting Humanoids to Move and Imitate," IEEE Intelligent Systems, Jul. 2000, pp. 18-24.

Arikan, O., et al., "Motion Synthesis from Annotations," ACM Transactions on Graphics, Proceedings of SIGGRAPH 2003, Jul. 2003, pp. 402-408, vol. 22, No. 3.

Arkin, R. C., "Behavior-Based Robotics," 1998, Chapter 3, pp. 104-121, The MIT Press, Cambridge, Massachusetts.

Badler, N. I., "Real-Time Virtual Humans," Proceedings of the International Conference on Digital Media Futures, 1999, 10 pages, Bradford, UK.

Brooks, R. A., "A Robust Layered Control System for a Mobile Robot," IEEE Journal of Robotics and Automation, Mar. 1986, pp. 14-23, vol. RA-2, No. 1.

Hodgins, J. K., et al., "Animating Human Athletes," Robotics Research, The Eighth International Symposium, 1998, pp. 356-367, Springer-Verlag Berlin Heidelberg New York.

Jenkins, O. C., "Data-Driven Derivation of Skills for Autonomous Humanoid Agents," Ph.D. dissertation, Dec. 2003, pp. 73-76, University of Southern California.

Khatib, O., "A Unified Approach for Motion and Force Control of Robot Manipulators: The Operational Space Formulation," IEEE Journal of Robotics and Automation, Feb. 1987, pp. 43-53, vol. RA-3, No. 1.

Khatib, O., "Whole-Body Dynamic Behavior and Control of Human-Like Robots," International Journal of Humanoid Robotics, 2004, pp. 29-43, vol. 1, No. 1.

Kovar, L., "Motion Graphs," ACM Transactions on Graphics, Jul. 2002, pp. 473-482, vol. 21, No. 3.

Lavalle, S. M., Planning Algorithms, 2006, Chapter 3, pp. 80-99, Cambridge University Press, New York.

Lee, J., "Interactive Control of Avatars Animated with Human Motion Data," Proceedings of SIGGRAPH 2002, Jul. 2002, pp. 491-500, San Antonio, Texas.

Levas, A., et al., "A User-Friendly High-Level Robot Teaching System," IEEE Proceedings of the International Conference on Robotics and Automation (ICRA), 1984, pp. 413-416.

Lozano-Pérez, T., "Robot-Motion: Planning and Control," 1982, pp. 473-498, Chapter 6, The MIT Press, Cambridge, Massachusetts.

Matarić, M. J., "Behaviour-Based Control: Examples from Navigation, Learning, and Group Behaviour," Journal of Experimental and Theoretical Artificial Intelligence, 1997, pp. 323-336, vol. 9, No. 2-3.

Matarić, M. J., "Getting Humanoids to Move and Imitate," IEEE Intelligent Systems, Jul./Aug. 2000, pp. 18-24.

Miller, A. T., "GraspIt!: A Versatile Simulator for Robotic Grasping," Ph.D. dissertation, 2001, pp. 78-94, Columbia University.

Nicolescu, M. N., et al., "Learning and Interacting in Human-Robot Domains," IEEE Special Issue of IEEE Transactions on Systems, Man, and Cybernetics—Part A: Systems and Humans, Sep. 2001, pp. 419-430, vol. 31, No. 5.

Perlin, K. et al., "Improv: A System for Scripting Interactive Actors in Virtual Worlds," Proceedings of SIGGRAPH 1996, 11 pages.

Schaal, S., et al., "Robot Juggling: Implementation of Memory-Based Learning," IEEE Control Systems Magazine, Feb. 1994, pp. 57-71, vol. 14, No. 1.

Yang, P.F., et al., "Layered Dynamic Control for Interactive Character Swimming," Eurographics/ ACM SIGGRAPH Symposium on Computer Animation, 2004, 9 pages, Grenoble, France.

* cited by examiner

EXTENSIBLE TASK ENGINE FRAMEWORK FOR HUMANOID ROBOTS

RELATED APPLICATIONS

This application claims benefit from U.S. provisional application No. 60/722,340, filed on Sep. 29, 2005 by Victor Ng-Thow-Hing et al., which is incoporated by reference herein in its entirety.

BACKGROUND OF THE INVENTION

1. Field of the Invention

The invention relates to control of robots, and specifically to organization and execution of instructions for humanoid robots.

2. Description of Background Art

Conventionally, humanoid robots have been controlled using robot instructions (code) customized for a particular configuration of humanoid robot. Robot-specific code is a natural initial approach to robot control, as it allows a limited set of programs to be coded quickly, supporting early-stage proof-of-concept and debugging efforts. However, as humanoid robot control matures, exclusive reliance on robot-specific code threatens to impede the goal of creating more sophisticated task behavior in humanoid robots having frequently changing hardware design. Humanoid robots could be more efficiently developed if an existing code base from a previous robot could be used in a new robot, if the capabilities of a robot could be flexibly extended, and if capabilities learned by a first robot could be transferred to a second robot.

To take advantage of an existing code base, it is desirable that humanoid robot instructions be easily portable from one robot to another. One approach is to design new humanoid robots to be able to operate on instructions written for previous robots. However, such a backwards-compatibility requirement would itself impede the development of humanoid robots, as robot designers would need to support outdated legacy instructions, introducing serious constraints on architecture and design changes.

Furthermore, to facilitate rapid learning of new capabilities by robots, it is desirable to have a method of executing on a new robot instructions obtained from a different robot. One approach is to transfer learned robot-specific instructions directly to the new robot. However, by definition, robot-specific instructions cannot be successfully executed on a new model of robot having different hardware designs, severely limiting the ability of a first generation of robots to pass their acquired capabilities to a second generation of robots with different hardware configuration.

Therefore, what is needed is a framework for humanoid robot instructions that allows portability of instructions, and supports transfer of learned capabilities from one robot to another.

SUMMARY OF THE INVENTION

The invention is an extensible task engine framework for humanoid robots. Robot instructions are stored as tasks and skills. Tasks are designed so that they can be executed by a variety of robots with differing configurations. A task refers to one or more skills. In one embodiment, a skill can be designed for a particular configuration of robot. Advantageously, a task can be transferred from robot to robot. When executed on a particular robot, the task makes calls to one or more skills that can take advantage of the capabilities of that robot. In one embodiment, tasks are robot-independent, and skills contain robot-dependent instructions.

In one embodiment, tasks and skills are stored on electronic media. In another embodiment, tasks and skills are executed from electronic media. In yet another embodiment, an electronic medium comprises at least one task and at least one skill. The electronic medium can be included as part of a robot control product.

In a further embodiment, robot instructions are stored as macrotasks. A macrotask refers to one or more tasks or macrotasks. Macrotasks are designed so that they can be executed by a variety of robots with differing configurations. A macrotask can be stored on or executed from an electronic medium.

DETAILED DESCRIPTION OF THE PREFERRED EMBODIMENTS

Figure 1:
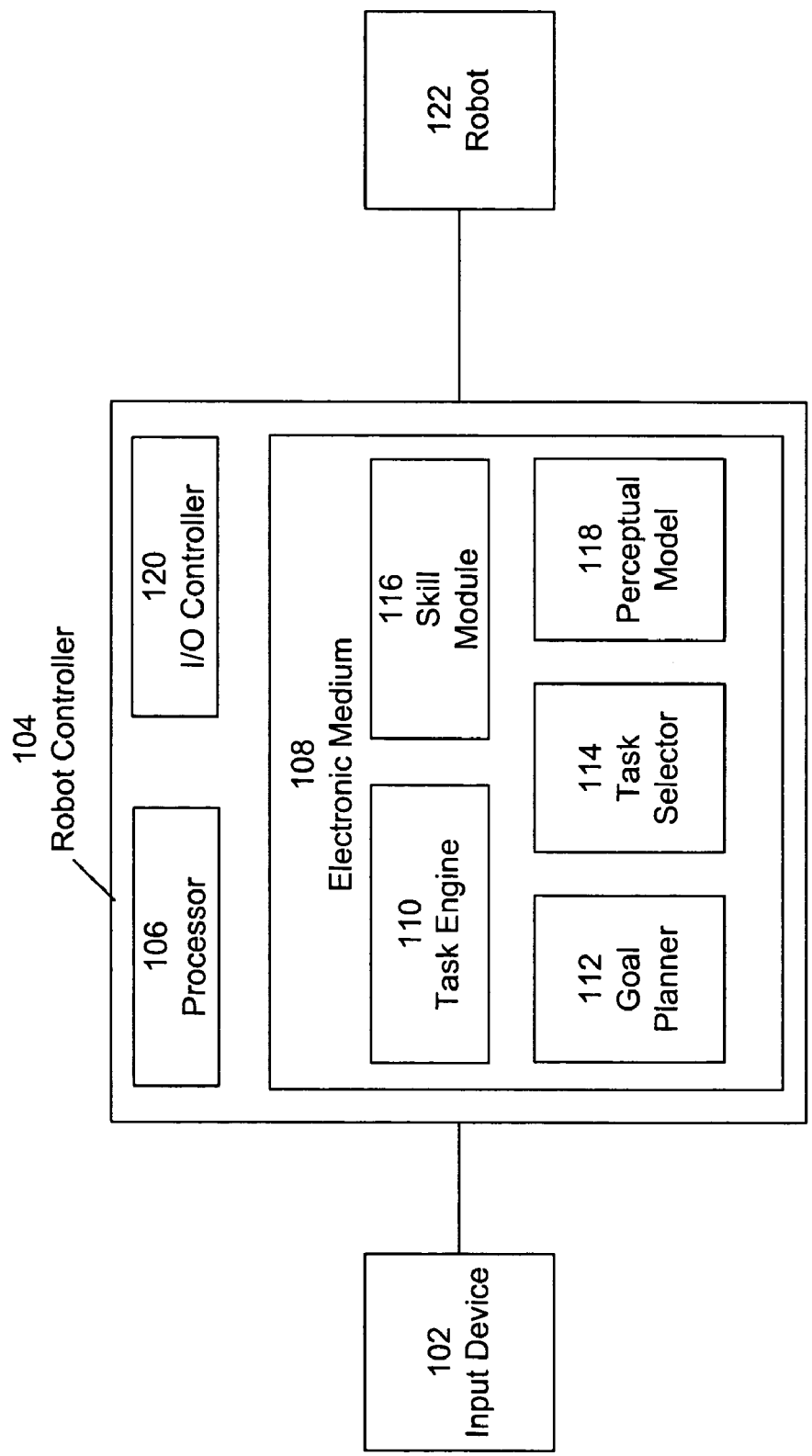
FIG. 1 illustrates a robot controller system, according to one embodiment of the present invention.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. Different parts of the algorithm could be embodied in different elements of hardware or software, for example, as in a distributed system.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

In one embodiment, robot instructions are stored in an extensible task engine framework. An electronic medium contains a set of tasks and a set of skills. A task is a set of instructions that can be executed by a variety of humanoid robots with differing configurations. A task executes by utilizing a robot's skills. Skills can be implemented using robot-specific commands. Tasks and skills can communicate through computer memory, network protocols, or any other communications medium.

A task is typically defined at a low enough level of granularity so that the task can be reused or combined to form more complicated tasks, advantageously facilitating development of new, higher-granularity tasks. Higher-granularity tasks making reference to other tasks are sometimes called "macrotasks". Tasks and macrotasks are designed to be portable from one humanoid robot to another.

In the context of this application, robot portability of an instruction refers to the ability of various humanoid robots of differing configurations to execute the instruction. Robot portability does not necessarily mean that an instruction can be executed by any humanoid robot. Typically, a task is portable to a particular humanoid robot if the skills used by that task are available on the humanoid robot. Standard skill sets for humanoid robots of various classes can be defined; and a robot portable instruction will be executable by standard-compliant robots of the class of robot for which the instruction is intended. For example, a class of robots could be defined (at least in part) by the skills implemented on robots of that class. A robot of a particular class would be able to perform any of a predefined set of skills. A robot portable task would be able to operate on any compliant robot by using skills from the predefined set. The implementation of the skills can vary from robot to robot, but the result of the skill would ideally be standardized and repeatable.

Storing instructions for humanoid robots in a framework of tasks and skills can provide numerous advantages. For example, development of humanoid robot programs can be separated from development of humanoid robot hardware. Task coders can focus on the design of new tasks rather than being concerned with hardware specific implementation details. Furthermore, a task coder could implement new procedures for a class of humanoid robots without even having access to a physical humanoid robot. A standard compliant simulation of a virtual humanoid robot can be used to demonstrate the functionality of tasks, simulating how a task would behave when executed on a physical humanoid robot.

Storing instructions for humanoid robots in a framework of tasks and skills also facilitates the portability of tasks from one robot to another. Because tasks refer to a standard set of skills, rather than to robot-specific commands directly, a first humanoid robot could be replaced by a second humanoid robot, and the second humanoid robot could perform the same tasks as were previously available on the first humanoid robot (provided the second humanoid robot implements an appropriate set of skills). A task framework also supports acquisition of new tasks, as new tasks can be stored in an extensible and standardized format. The task abstraction advantageously facilitates generalizations useful to learning by observation, an important objective for development of autonomous humanoid robots.

FIG. 1 illustrates a robot controller system, according to one embodiment of the present invention. The robot controller 104 is connected for sending commands to a robot 122. The robot 122 is configured to execute commands received from the robot controller 104, and is connected for sending sensor data (such as position, video, or feedback information) to the robot controller 104. In one embodiment, the robot 122 is a humanoid robot. A humanoid robot is a mechanical device that has similar body configuration of an able-bodied human. Typically a humanoid robot includes a torso with a head, two arms, and a mobile base. The mobile base can be driven with different mechanisms, such as two legs or a wheeled base.

For the purposes of illustration, the robot controller 104 has been shown as being separate from the robot 122. In one embodiment, the robot controller 104 can be included as a component of the robot 122. In another embodiment, the elements and functions of the robot controller 104 can be distributed between a robot controller included in the robot 122 and a robot controller external to the robot 122. The included robot controller and the external robot controller are configured to cooperatively perform the functions described herein with respect to the robot controller 104.

Optionally, an input device 102 is connected to the robot controller 104. The input device 102 is capable of receiving user commands and sending them to the robot controller 104. For example, the input device 102 can be implemented as a keyboard, a mouse, a voice recognition system, a software program, a video camera, and so on. The input device 102 can be used to select goals or tasks for the robot 122 to perform.

The robot controller 104 includes a processor 106, an input/output (I/O) controller 120, and an electronic medium 108. The I/O controller 120 is configured to connect to the input device 102, the robot 122, and/or any other device which it may be desirable to connect to the robot controller 104. For example, the I/O controller 120 can be configured to manage the sending of instructions to the robot 122 and the reception of sensor data from the robot 122.

The processor 106 is capable of executing instructions, such as the instructions stored on the electronic medium 108. The processor is configured to execute instructions stored on the electronic medium 108 to generate robot commands, which can be sent to the robot 122 using the I/O controller 120. When an instruction executed by the processor causes a robot command to be executed by the robot, the instruction is sometimes said to be executed by the robot, despite that the processor 106 may in fact be external to the robot 106.

The electronic medium 108 is capable of storing instructions for the processor 106. The electronic medium can be implemented, for example, as a hard disk, as random access memory (RAM), read-only memory (ROM), an optical drive, and so on. Other examples of electronic media will be apparent to one of ordinary skill in the art without departing from the scope of the present invention. For the purposes of illustration, a single electronic medium 108 is shown. In one embodiment, the electronic medium 108 can include multiple electronic media. For example, a first portion of the electronic medium 108 can include a hard disk, and a second portion of the electronic medium 108 can include a random access memory.

The electronic medium 108 includes a task engine 110, a skill module 116, a goal planner 112, a task selector 114, and a perceptual model 118. A task engine 110, according to one embodiment of the present invention, is described herein with reference to FIG. 3. A skill module 116 is a collection of program functions (skills) with a standard function calling interface. A function in a first skill module 116 can be called using the same function calls as a function in a second skill module 116. Functions in the skill module 116 implement robot skills using one or more robot commands. For example, calling a function in the skill module 116 can include executing the function on the processor 106, and executing the function on the processor 106 can cause the robot controller 104 to send a set of robot commands to the robot 122. In one embodiment, the skill module 116 is implemented as a device driver. For example, the skill module 116 can be implemented as a device driver configured to apply joint angles to a robot's limbs.

A goal planner 112 is a program capable of determining a series of steps to be completed by the robot 122 to achieve a goal. The goal planner 112 can evaluate dependencies to determine an order in which steps should be performed to complete a goal requested by a user. The goal planner 112 can include any number of various artificial intelligence and/or learning algorithms to facilitate goal planning.

A task selector 114 is a program capable of determining a task appropriate to accomplish a step. The task selector 114 can receive a step from the goal planner 112 and select a task from the tasks available in the task engine 110. The task selector can include an algorithm for evaluating available tasks in the task engine 110 and choosing an appropriate task.

The task selector 114 and the goal planner 112 have been given as examples of components which can be used to select a task available in the task engine 110. In one embodiment, the task selector 114 selects a task in the task engine 110 directly, without input from a goal planner 112. In another embodiment, a task is selected based on user input. Other examples of methods for selecting a task will be apparent to one of ordinary skill in the art without departing from the scope of the present invention.

The perceptual model 118 is a program capable of interpreting sensor data received from the robot 122. In one embodiment, the perceptual model 118 is capable of interpreting data received from sensors located in the environment of the robot. These sensors may or may not reside on the robot's body. The perceptual model 118 is also capable of sending commands to the robot 122 to facilitate the collection of sensor data. In one embodiment, the perceptual model 118 includes a set of functions that can be called by the task engine 110. A function in a first perceptual module 118 can be called using the same function calls as a function in a second perceptual model 118. Functions in the perceptual model 118 return information about the robot 122 and its environment. In one embodiment, the perceptual model 118 is implemented as a device driver. For example, the perceptual model 118 can be implemented as a device driver configured to capture information about object position from a camera system.

For the purposes of illustration, the components of the robot controller 104 have been shown in a unified device. In practice, the functions and elements of the robot controller 104 can be distributed over any number of devices or systems. For example, the robot controller 104 can be implemented using any number of processors 106 in any number of computer systems. Similarly, components such as the task engine 110 and the skill module 116 can be stored on different electronic media 108, which can be included in different systems. In one embodiment, for example, a first system includes the task engine 110 and a first processor, and a second system includes the skill module 116 and a second processor. Various configurations of robot controllers 104 will be apparent to one of ordinary skill in the art without departing from the scope of the present invention.

Figure 2:
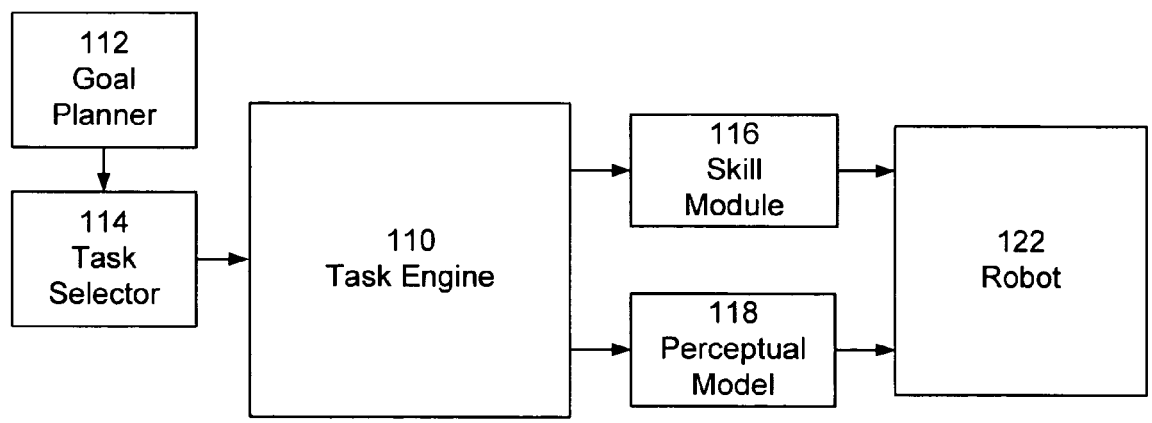
FIG. 2 illustrates controlling a robot using a task engine, according to one embodiment of the present invention.

FIG. 2 illustrates controlling a robot using a task engine, according to one embodiment of the present invention. In one embodiment, the goal planner 112 receives a goal, for example, from user input or as part of a scheduled routine, and determines the order in which steps to achieve that goal should be performed. The task selector 114 selects one or more tasks to achieve the steps set out by the goal planner 112. In another embodiment, tasks are selected based on user input. Other examples of task selection will be apparent to one of ordinary skill in the art without departing from the scope of the present invention.

The task engine 110 receives a selection of a task and causes the robot 122 to execute the task. A task engine 110, according to one embodiment of the present invention, is described herein with reference to FIG. 3. The implementation of the task engine 110 can be compatible with various goal planning and task selection schemes. Advantageously, the task engine 110 typically does not restrict the freedom of designing and experimenting with different goal planners 112 or task selectors 114. The task engine 110 can be beneficially used with new or even experimental goal planning and task selection methods.

To carry out the task 110, the task engine 110 interfaces to the robot 122 using the skill module 116 and the perceptual model 118. The task engine 110 calls to the skill module 116 to cause the robot 122 to perform a particular skill. The task engine 110 calls to the perceptual model 118 to request information about the environment of the robot. Because the skill module 116 and the perceptual model 118 present a standard set of functions to the task engine 110, the task engine 110 can interface with various skill modules and perceptual models, and be used for a variety of humanoid robots 122 with differing configurations. The skill module 116 and a perceptual model 118 can be designed for a specific humanoid robot 122, and advantageously provide a layer of abstraction between the robot portable task engine 110 and the robot-specific implementation details of the robot 122.

In response to receiving a call to a particular skill, the skill module 116 issues robot commands to the robot 122. The skill module 116 contains instructions capable of carrying out the skill on the robot 122. For the example of a "Move arm to location X" skill, the skill module 116 can use robot-specific commands to determine location X with respect to the robot 122, move the arm of the robot 122, receive feedback regarding the location of the arm of the robot 122, and determine when the arm of the robot 122 is in the requested position. As various robots use differing methods for feedback and control, the implementation of the skill can vary from robot to robot, but the result of the execution of the skill would be the same: the arm of the robot 122 is moved to location X. Other examples of skills include trajectory tracking, motion planning, trajectory resealing, forward and inverse kinematics, and a method for determining the requisite humanoid hand configuration for grasping a given object. Because the skill module 116 can vary from robot to robot, the skill module 116 can issue robot commands appropriate for the particular control and feedback systems implemented on the robot 122.

In response to receiving a request for perceptual information, the perceptual model 118 returns information regarding the environment of the robot 122. The perceptual model 118 receives sensor data from the robot 118 and builds hypotheses. The perceptual model 118 can also issue robot commands, for example, to cause the robot 122 to send specific sensor data, to change the mode of a sensor, or to move in some way so that data can be collected. In some circumstances, the perceptual model 118 can respond to a request for perceptual information based on information already in the perceptual model 118. In other circumstances, the request for perceptual information causes the perceptual model 118 to issue robot commands to the robot 122 to facilitate collecting information so that the perceptual model 118 can respond to the request properly. Because the perceptual model 118 can vary from robot to robot, the perceptual model 118 can be designed for the specific sensors available on the robot 122. For example, it may be advantageous to use a different perceptual model 118 for a robot equipped with a digital camera than for a robot equipped with an array of range finders. Because the perceptual model 118 presents a standard interface to the task engine 110, tasks can take advantage of information available in the perceptual model 118 without being limited to robots with a particular configuration of sensors. The results returned by a first perceptual model 118 can be different from those returned by a second perceptual model, but both are in a common format so that they can be interpreted and used by a robot-portable task.

Figure 3:
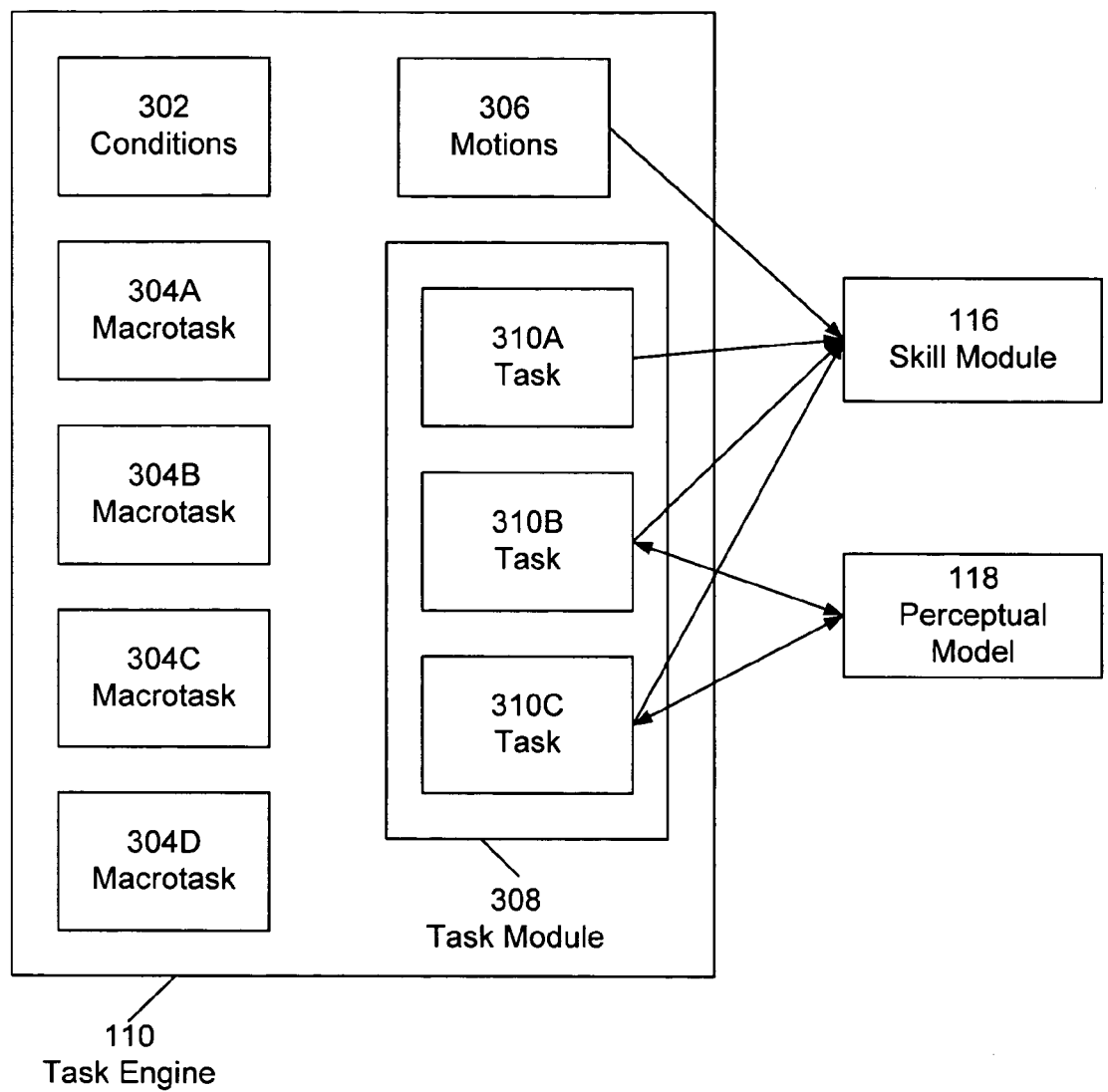
FIG. 3 illustrates a task engine, according to one embodiment of the present invention.

FIG. 3 illustrates a task engine, according to one embodiment of the present invention. The task engine 110 includes conditions 302, macrotasks 304 (such as 304A, 304B, 304C, and 304D), motions 306, and tasks 310 (such as 310A, 310B, and 310C).

In one embodiment, the task engine 110 includes one or more conditions 302. A condition 302 is a test of the state of the robot or the environment. Depending on the state of the robot or the environment, a condition 302 can be true or false. A task 310 can refer to one or more conditions 302, and the control flow of the task 310 can depend on whether a condition 302 is true or false. Because a condition 302 can be referenced by any number of tasks 310, instructions can be reused and coding of new tasks simplified. A condition 302 can similarly be referenced by any number of macrotasks 304. When a task 310 referring to a condition 302 is executed, the task engine 110 can call the skill module 116 and/or perceptual model 118 to determine if the condition 302 is met. Examples of conditions 302 include, but are not limited to, a test for the distance between two objects, a test for the comparative vertical positions of two objects, a test for the posture of the humanoid robot, a test for whether the humanoid robot is grasping an object, and a test for whether an object is graspable. Other examples of conditions can be implemented without departing from the scope of the present invention.

In one embodiment, the task engine 110 includes one or more macrotasks 304. A macrotask is a set of instructions referring to tasks 310 or other macrotasks 304. In one embodiment, macrotasks are stored on an electronic medium in a structured format, such as an XML file. In one embodiment, a macrotask is read or loaded in response to a call to that macrotask. A method for executing a macrotask, according to one embodiment of the present invention, is described herein with reference to FIG. 4.

In one embodiment, a macrotask 304 is executed as a message driven machine. A message driven machine can be implemented as a state machine that allows for both sequential and concurrent execution of tasks. Multiple states can typically be active simultaneously. A message driven machine can also interact with other message driven machines by sending and receiving messages. Tasks are executed or terminated based on messages from other tasks. Control flow in a message driven machine can also be controlled by preconditions or inconditions. A precondition is a condition 302 to be met before beginning a macrotask 304. An incondition is a condition 302 to be met in order to continue a macrotask 304. Executing a macrotask 304 subject to preconditions and inconditions can be beneficial for avoiding conflicts of the resources of the robot 122, and for ensuring successful operation of the macrotask 304.

Macrotasks 304 are advantageous because of their flexibility and extensibility. A macrotask 304 can be acquired, loaded, and executed while the task engine 110 is executing other macrotasks 304 on the robot 122. Furthermore, a macrotask 304 can reference other macrotasks 304. If the task engine 110 does not contain the referenced macrotask 304, the task engine 110 can acquire and load the referenced macrotask 304 in real time. A macrotasks 304 can be acquired, for example, from a library of macrotasks. The process of designing a macrotask 304 is simplified, because a designer can refer to existing macrotasks. Furthermore, macrotasks 304 can specify work at a high enough level that many technical implementation details are abstracted away from the macrotask 304, freeing the designer to develop useful and efficient macrotasks 304. Examples of macrotasks include, but are not limited to, picking up objects, putting down objects, vacuuming, and greeting. Several examples of macrotasks are described herein with reference to FIGS. 5-6.

At least some macrotasks 304 refer to tasks 310. In one embodiment, the tasks 310 are stored in a task module 308. The task module 308 is a library of functions. In one embodiment, the task module 308 is implemented as a dynamically linked library (DLL). Storing tasks 310 in a dynamically linked library beneficially allows tasks 310 to be added or removed while the task engine 110 is running.

A task 310 is a set of instructions that refers to one of more skills. A task can execute subject to preconditions or inconditions. A task runs for some (potentially indefinite) period of time performing robot skills. A task can also be called with parameters, advantageously allowing a "wave hand" task to be used for waving the robot's left hand, the robot's left hand, or either hand. A "wave hand" task can also be called with parameters specifying, for example, the period and duration of the desired hand wave. Parameters facilitate the reuse of instructions and introduce flexibility to task calling.

A task 310 may include a reference to at least one skill. For example, the task 310 can include a name or identifier of a skill that should be executed as part of the execution of the task. When the task 310 is executed, the skill is retrieved from the skill module 116 and executed on the robot. The skill module 116 can include multiple skills identified by the same reference. For example, the skill module 116 can include several trajectory following skills with a common identifier. The various trajectory following skills, for example, can be designed for different robot configurations.

Examples of tasks include, but are not limited to, programs for reaching, programs for grasping, programs for releasing, programs for taking a posture, and programs for moving the robot to a particular position. Other examples of tasks can be implemented without departing from the scope of the present invention.

Motions 306 are predefined movement routines that can be executed by the robot 122. In one embodiment, a motion 306 selected for execution is sent to the skill module 116, which generates robot commands to cause the robot 122 to carry out the motion 306. The motion 306 can be portable from robot to robot, but in one embodiment, need not be. Motions 306 advantageously allow an instruction coder to specify robot movements at a level of detail that may be finer than that provided by tasks 310 or macrotasks 304.

Figure 4:
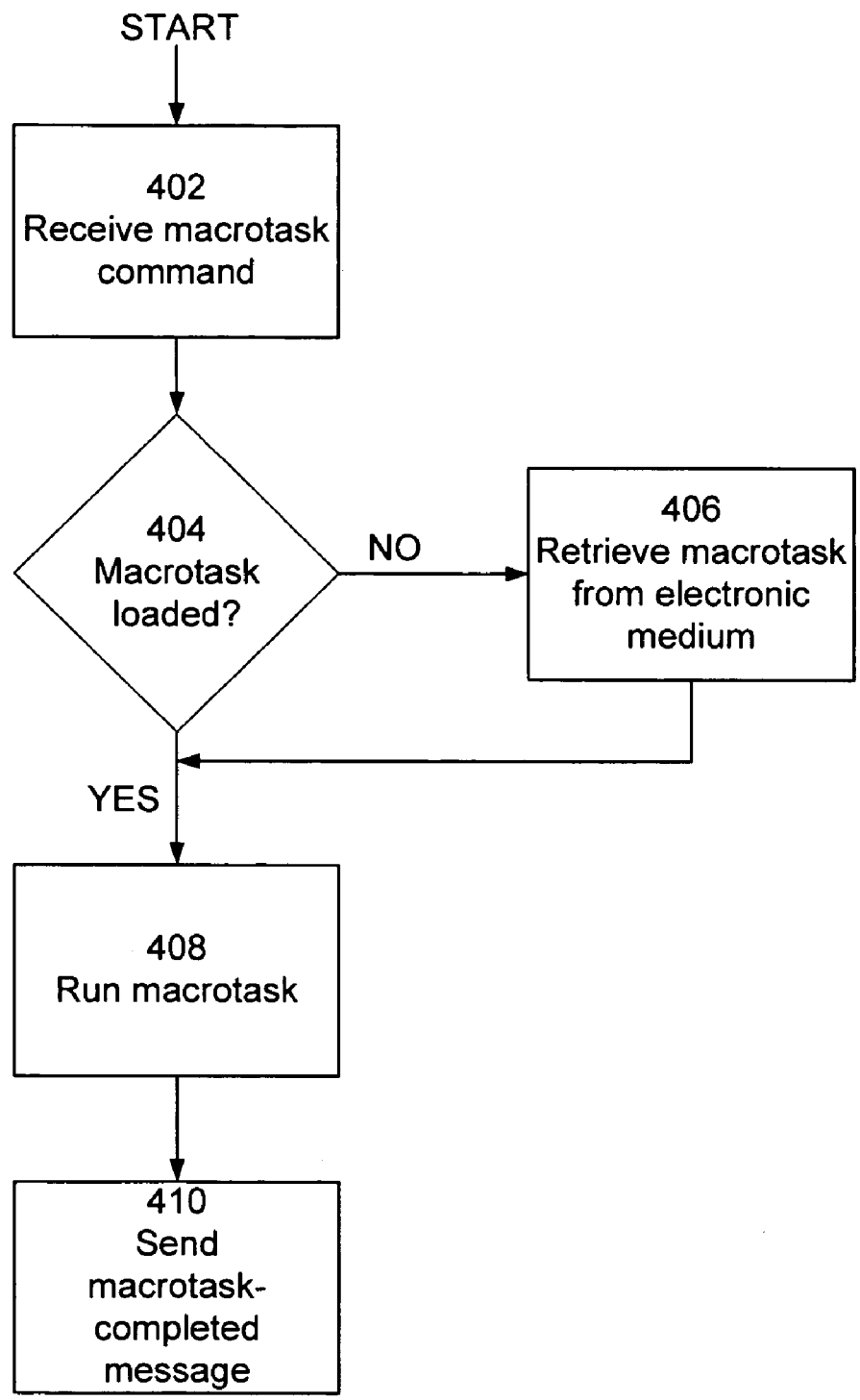
FIG. 4 illustrates a method of executing a macrotask, according to one embodiment of the present invention.

FIG. 4 illustrates a method of executing a macrotask, according to one embodiment of the present invention. In one embodiment, the method is performed by the task engine 110.

The task engine 110 receives 402 a macrotask command. For example, the task engine 110 can receive a selection of a macrotask from a user, from the task selector 114, or based on the execution of another macrotask. In one embodiment, the macrotask command includes parameters appropriate for running the macrotask.

The task engine 110 determines 404 if the macrotask is loaded. If the task engine 110 determines 404 that the macrotask is not loaded, the task engine 110 retrieves 406 the macrotask from an electronic medium. For example, the task engine 110 can retrieve 406 the macrotask from a macrotask library. According to one embodiment of the present invention, retrieving 406 the macrotask includes importing the macrotask from an XML file. By importing a macrotask from an XML file, the set of available macrotasks can be flexible and extensible.

The task engine 110 runs 408 the macrotask. Running the macrotask 408 includes executing other macrotasks and/or tasks referenced by the macrotask. Running 408 the macrotask can also include determining conditions to control the execution flow of the macrotask, sending and/or receiving messages from other macrotasks. Examples of running 408 macrotasks are described herein with reference to FIGS. 5 and 6.

The task engine 110 sends 410 a macrotask-completed message to the entity from which the macrotask command was received 402. For example, the task engine 110 can send 410 a macrotask-completed message to another macrotask, to the task selector 114, or to a user. Sending 410 a macrotask-completed message advantageously allows other entities depending on the execution of the macrotask to base their behavior on the completion of the macrotask.

Figure 5:
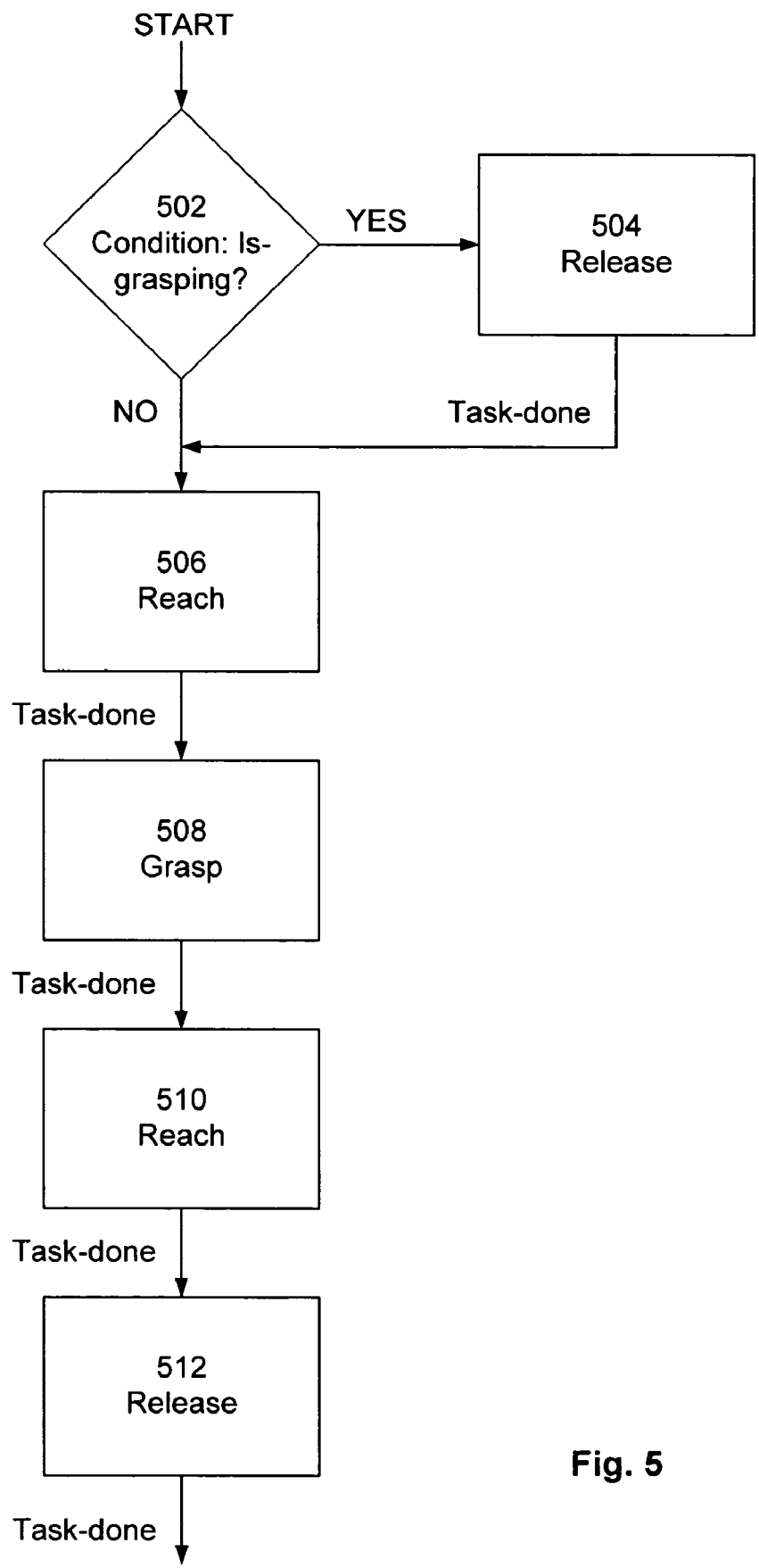
FIG. 5 illustrates a first example of a macrotask, according to one embodiment of the present invention.

FIG. 5 illustrates a first example of a macrotask, according to one embodiment of the present invention. In one embodiment, the elements of the macrotask are stored in a macrotask library and loaded by the task engine 110. In the example illustrated, the macrotask is a "Pick-and-Place" macrotask. The objective of the macrotask is to pick up an object and place it in a different position. The parameters of the macrotask in the example include an arm identifier, a hand identifier, an object identifier, and a target location.

The macrotask evaluates 502 an is-grasping condition. For example, the macrotask can contain a reference to one of the conditions 302. The condition 302 includes a test for whether the hand specified by the hand identifier parameter is in the grasping or not-grasping state.

The outcome of the is-grasping condition effects the control flow of the macrotask. If the hand is-grasping condition is true, the macrotask calls to a release 504 task. The call to the release task 504 can also include related parameters, such as the hand identifier. The release task 504 refers to the appropriate skills to cause the robot 122 to release the specified hand. The release task 504 sends a task-done message back to the calling macrotask.

In response to receiving the task-done message from the release task 504, or if the hand is-grasping condition is false, the macrotask calls to a reach task 506. The call to the reach task 506 can also include related parameters, such as the arm identifier and the location of the object. The reach task 506 refers to the appropriate skills to cause the robot 122 to reach the specified arm to the location of the object. The reach task 506 sends a task-done message back to the calling macrotask.

In response to receiving the task-done message from the reach task 506, the macrotask calls to a grasp 508 task. The call to the grasp task 508 can also include related parameters, such as the hand identifier and the location of the object. The grasp task 508 refers to the appropriate skills to cause the robot 122 to grasp the object. The grasp task 508 sends a task-done message back to the calling macrotask.

In response to receiving the task-done message from the grasp task 508, the macrotask calls to the reach task 510. The reach task 510 can reuse instructions based on similarities to the reach task 506. The call to the reach task 510 can also include related parameters, such as the arm identifier and the target location. The reach task 510 refers to the appropriate skills to cause the robot 122 to reach the specified arm to the target location. The reach task 510 sends a task-done message back to the calling macrotask.

In response to receiving the task-done message from the reach task 510, the macrotask calls to the release task 512. The release task 512 can reuse instructions based on similarities to the release task 504. The call to the release task 512 can also include related parameters, such as the hand identifier. The release task 512 refers to the appropriate skills to cause the robot 122 release the specified hand. The release task 512 sends a task-done message back to the calling macrotask. The macrotask has completed execution, and can send a macrotask-complete message on to its caller.

Figure 6:
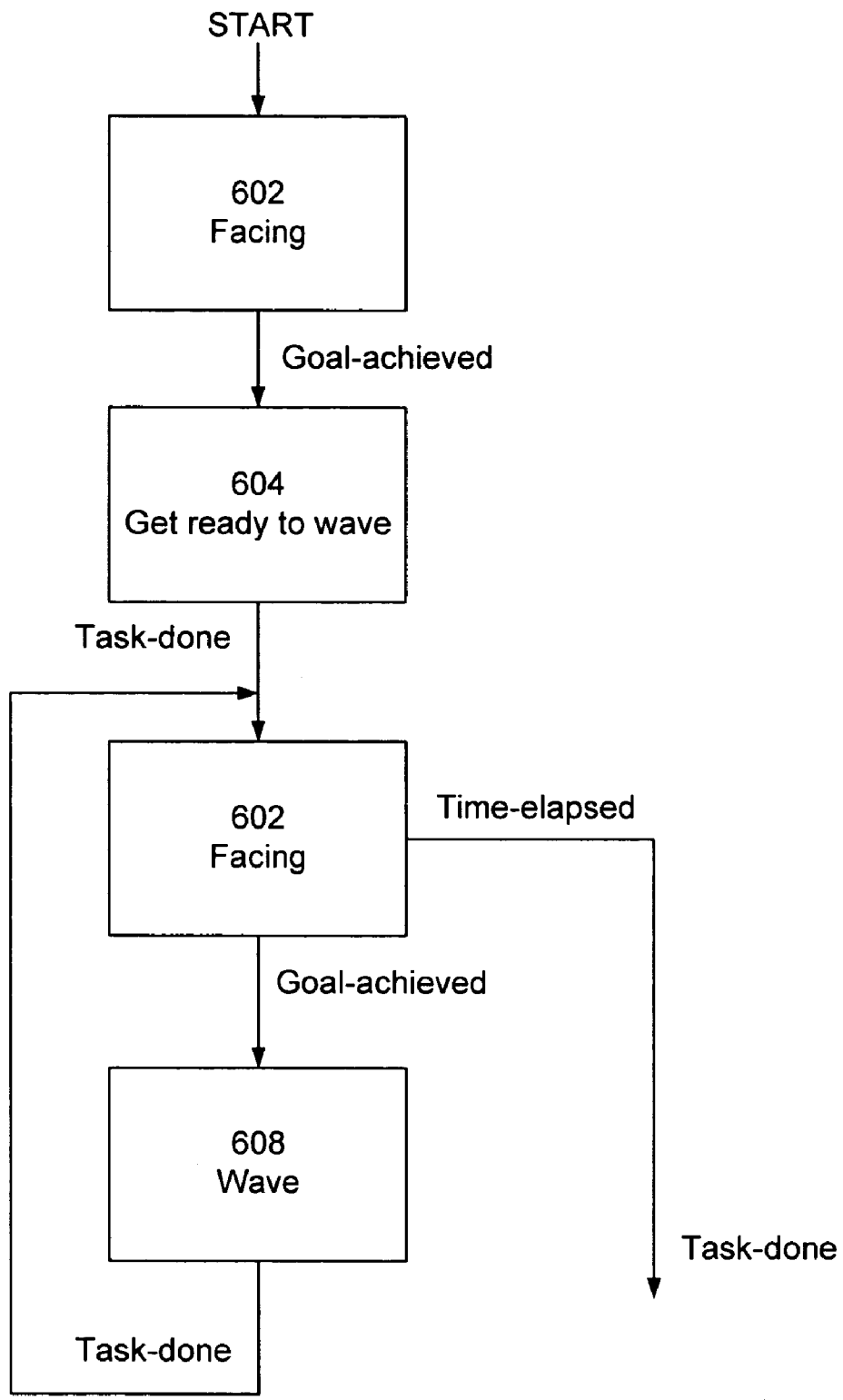
FIG. 6 illustrates a second example of a macrotask, according to one embodiment of the present invention.

FIG. 6 illustrates a second example of a macrotask, according to one embodiment of the present invention. In one embodiment, the elements of the macrotask are stored in a macrotask library and loaded by the task engine 110. In the example illustrated, the macrotask is a "Face-and-Wave" macrotask. The objective of the macrotask is to identify an object in a room and wave to it.

The macrotask calls to a facing task 602. The facing task 602 refers to the appropriate skills and/or perceptual models to cause the robot 122 to identify an object and move to face it. The facing task 602 continues running, and sends a goal-achieved message back to the calling macrotask.

In response to receiving the goal-achieved message from the facing task 602, the macrotask calls to a get ready to wave task 604. The get ready to wave task 604 refers to the appropriate skills to cause the robot 122 to prepare to make a waving motion. For example, the robot 122 can extend its arm in a waving position. The get ready to wave task 604 sends a task-done message back to the calling macrotask.

In response to receiving the task-done message from the get ready to wave task 604, the macrotask calls to the facing 602 task. The facing task 602 continues running, and sends a goal-achieved message back to the calling macrotask.

In response to receiving the goal-achieved message from the facing task 602, the macrotask calls to the wave task 608. The wave task 608 refers to the appropriate skills to cause the robot 122 to make a waving motion. In one embodiment, the wave task 608 refers to the appropriate skills to cause the robot 122 to make a wave motion in accordance with specified parameters, such as the period and duration of the desired wave. The wave task 608 sends a task-done message back to the calling macrotask.

The macrotask continues to loop, executing both the facing task 602 and the wave task 608 simultaneously. The wave task 608 can be restarted periodically, for example, in response to the goal-achieved messages from the facing task 602. When the facing task 602 completes, for example, in response to a user command, after the expiration of a timer, or because no object can be found, the wave task 608 is ended and a task-done message is sent back to the calling macrotask. The macrotask has completed execution, and can send a macrotask-complete message on to its caller.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A method for storing instructions for a humanoid robot, the method comprising:
   storing a first set of instructions on a first electronic medium, the first set of instructions comprising instructions for a humanoid robot to perform a first task, the first set of instructions comprising a first reference, the first reference comprising a reference to a second set of instructions, the first set of instructions is capable of being executed by a plurality of humanoid robots of various configurations; and
   storing the second set of instructions on a second electronic medium, the second set of instructions comprising instructions for the humanoid robot to perform a first skill.

2. The method of claim 1, wherein the second set of instructions is designed to be executed by a first configuration of humanoid robot.

3. The method of claim 2, wherein the first reference further comprises a reference to a third set of instructions.

4. The method of claim 3, the method further comprising:
   storing the third set of instructions on a third electronic medium, the third set of instructions comprising instructions for the humanoid robot to perform the first skill.

5. The method of claim 4, wherein the third set of instructions is designed to be executed by a second configuration of humanoid robot.

6. The method of claim 1, wherein the first set of instructions further comprises a second reference, the second reference comprising a reference to a third set of instructions, the method further comprising:
   storing the third set of instructions on a third electronic medium, the third set of instructions comprising instructions for the humanoid robot to perform a second skill.

7. The method of claim 1, the method further comprising:
   storing a third set of instructions on a third electronic medium, the third set of instructions comprising instructions for the humanoid robot to perform a macrotask, the third set of instructions comprising a second reference, the second reference comprising a reference to the first set of instructions, the third set of instructions is capable of being executed by a plurality of humanoid robots of various configurations.

8. The method of claim 7, the method further comprising:
   storing a fourth set of instructions on a fourth electronic medium, the fourth set of instructions comprising instructions for the humanoid robot to perform a second task.

9. The method of claim 8, wherein the third set of instructions further comprises a third reference, the third reference comprising a reference to the fourth set of instructions.

10. A method for executing instructions for a humanoid robot, the method comprising:
    executing a first set of instructions, the first set of instructions comprising instructions for a humanoid robot to perform a first task, the first set of instructions includes a reference first reference, the first reference comprising a reference to a second set of instructions, the first set of instructions is capable of being executed by a plurality of humanoid robots of various configurations; and
    executing the second set of instructions, the second set of instructions comprising instructions for the humanoid robot to perform a first skill.

11. The method of claim 10, wherein the second set of instructions is designed to be executed by a first configuration of humanoid robot.

12. The method of claim 11, wherein the first reference further comprises a reference to a third set of instructions.

13. The method of claim 12, the method further comprising:
executing the third set of instructions, the third set of instructions comprising instructions for the humanoid robot to perform the first skill.

14. The method of claim 13, wherein the third set of instructions is designed to be executed by a second configuration of humanoid robot.

15. The method of claim 10, wherein the first set of instructions further comprises a second reference, the second reference comprising a reference to a third set of instructions, the method further comprising:
executing the third set of instructions, the third set of instructions comprising instructions for the humanoid robot to perform a second skill.

16. The method of claim 10, the method further comprising:
executing a third set of instructions, the third set of instructions comprising instructions for the humanoid robot to perform a macrotask, the third set of instructions comprising a second reference, the second reference comprising a reference to the first set of instructions, the third set of instructions is capable of being executed by a plurality of humanoid robots of various configurations.

17. The method of claim 16, the method further comprising:
executing a fourth set of instructions, the fourth set of instructions comprising instructions for the humanoid robot to perform a second task.

18. The method of claim 17, wherein the third set of instructions further comprises a third reference, the third reference comprising a reference to the fourth set of instructions.

19. An robot control product for controlling a humanoid robot, the robot control product comprising an electronic medium, the electronic medium comprising:
a first set of instructions, the first set of instructions comprising instructions for a humanoid robot to perform a first task, the first set of instructions comprising a first reference, the first reference comprising a reference to a second set of instructions, the first set of instructions is capable of being executed by a plurality of humanoid robots of various configurations; and
the second set of instructions, the second set of instructions comprising instructions for the humanoid robot to perform a first skill.

20. The robot control product of claim 19, wherein the second set of instructions is designed to be executed by a first configuration of humanoid robot.

21. The robot control product of claim 20, wherein the first reference further comprises a reference to a third set of instructions.

22. The robot control product of claim 21, the electronic medium further comprising the third set of instructions, the third set of instructions comprising instructions for the humanoid robot to perform the first skill.

23. The robot control product of claim 22, wherein the third set of instructions is designed to be executed by a second configuration of humanoid robot.

24. The robot control product of claim 19, wherein the first set of instructions further comprises a second reference, the second reference comprising a reference to a third set of instructions, the electronic medium further comprising the third set of instructions, the third set of instructions comprising instructions for the humanoid robot to perform a second skill.

25. The robot control product of claim 19, the electronic medium further comprising:
a third set of instructions, the third set of instructions comprising instructions for the humanoid robot to perform a macrotask, the third set of instructions comprising a second reference, the second reference comprising a reference to the first set of instructions, the third set of instructions is capable of being executed by a plurality of humanoid robots of various configurations.

26. The robot control product of claim 25, the electronic medium further comprising:
a fourth set of instructions, the fourth set of instructions comprising instructions for the humanoid robot to perform a second task.

27. The robot control product of claim 26, wherein the third set of instructions further comprises a third reference, the third reference comprising a reference to the fourth set of instructions.

* * * * *

UNITED STATES PATENT AND TRADEMARK OFFICE
CERTIFICATE OF CORRECTION

PATENT NO. : 7,383,100 B2  Page 1 of 1
APPLICATION NO. : 11/529052
DATED : June 3, 2008
INVENTOR(S) : Victor Ng-Thow-Hing and Evan Drumwright It is certified that error appears in the above-identified patent and that said Letters Patent is hereby corrected as shown below:

Column 13, line 40, after "19." and before "robot", delete "An" and insert -- A --.

Signed and Sealed this

Eighteenth Day of November, 2008

JON W. DUDAS
*Director of the United States Patent and Trademark Office*